March 1, 1966 H. D. DAIGH 3,237,615
EXHAUST RECYCLE SYSTEM
Filed Nov. 13, 1962 6 Sheets-Sheet 1
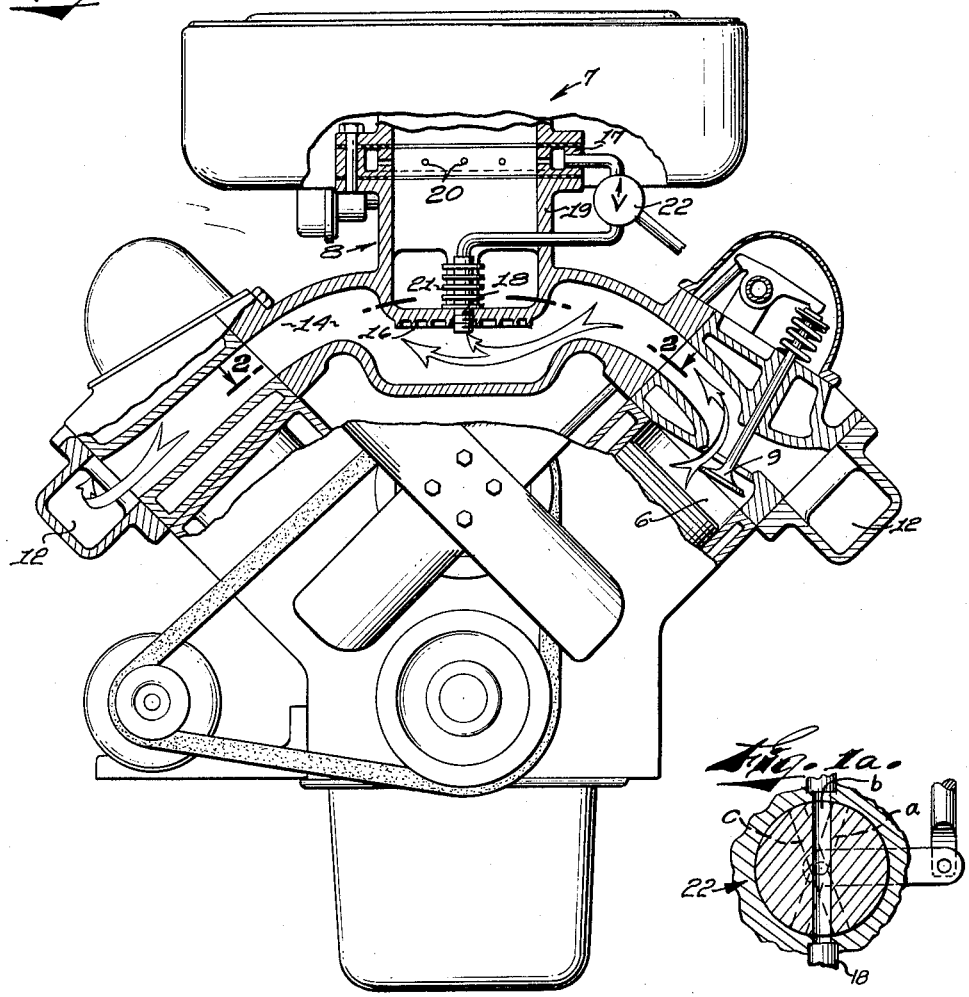
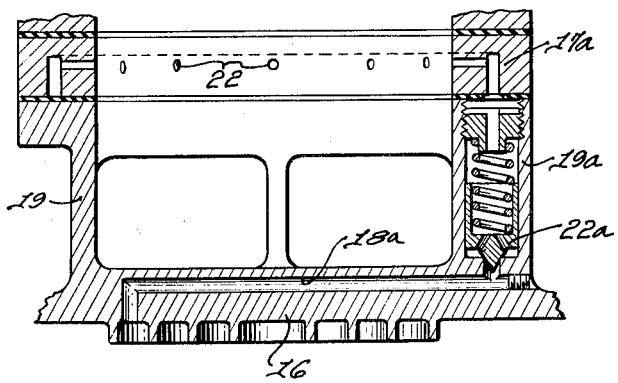
INVENTOR.
HAROLD D. DAIGH
BY
Donald W Canady
ATTORNEY March 1, 1966 H. D. DAIGH 3,237,615
EXHAUST RECYCLE SYSTEM
Filed Nov. 13, 1962 6 Sheets-Sheet 2

INVENTOR.
HAROLD D. DAIGH
BY Donald W Canady
ATTORNEY

March 1, 1966  H. D. DAIGH  3,237,615
EXHAUST RECYCLE SYSTEM
Filed Nov. 13, 1962  6 Sheets-Sheet 3
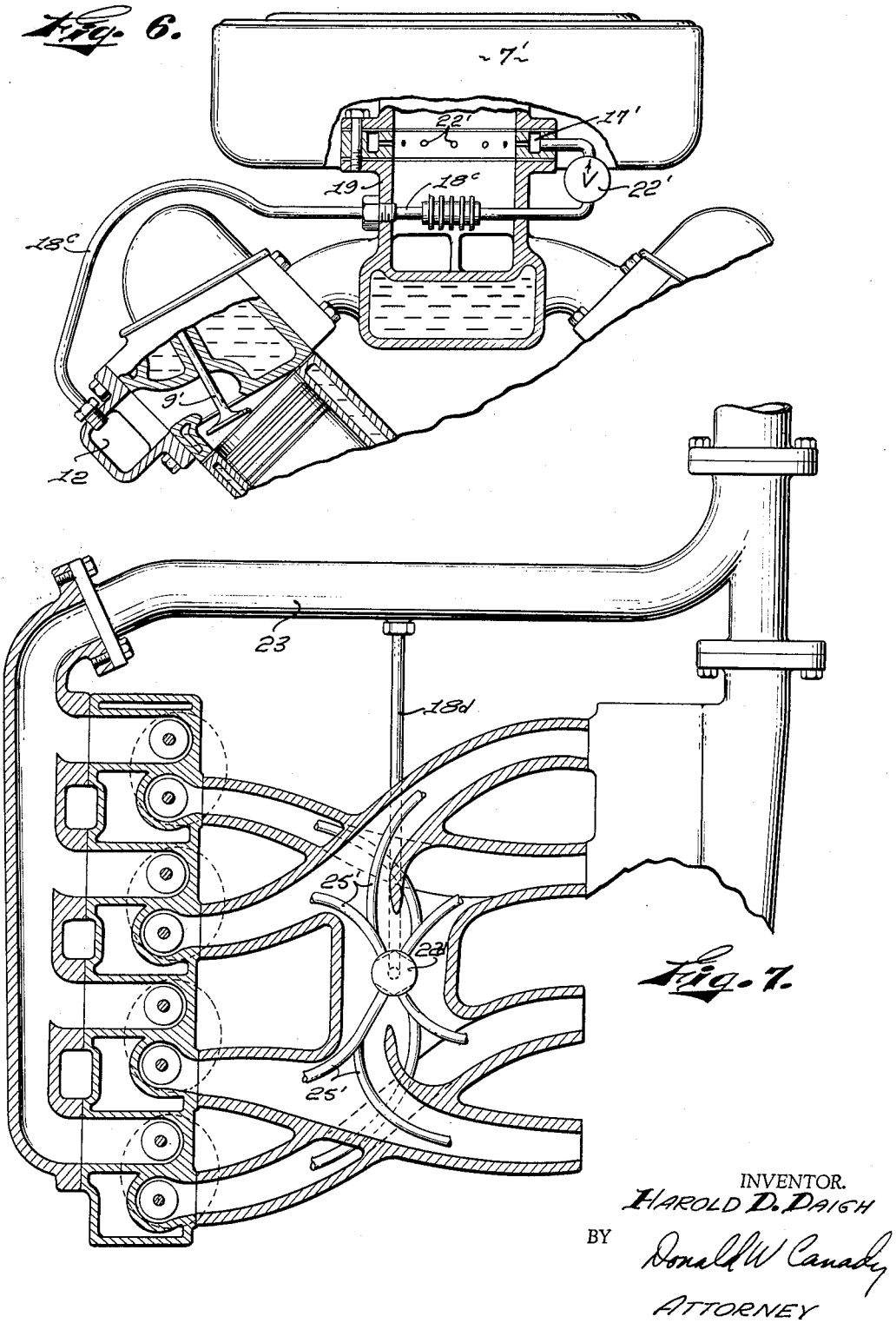
INVENTOR.
HAROLD D. DAIGH
BY Donald W Canady
ATTORNEY March 1, 1966    H. D. DAIGH    3,237,615
EXHAUST RECYCLE SYSTEM
Filed Nov. 13, 1962    6 Sheets-Sheet 4
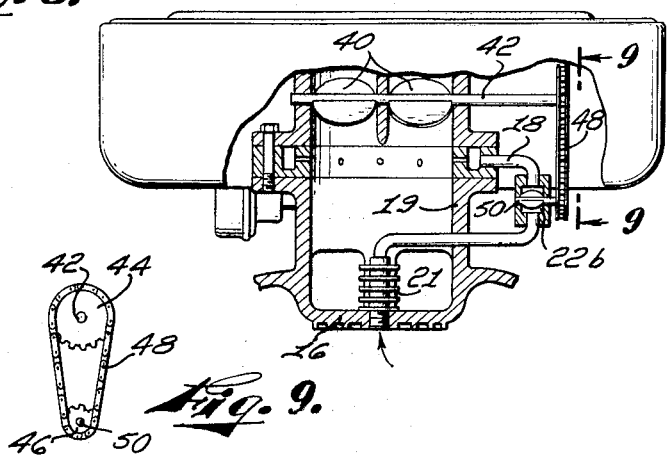
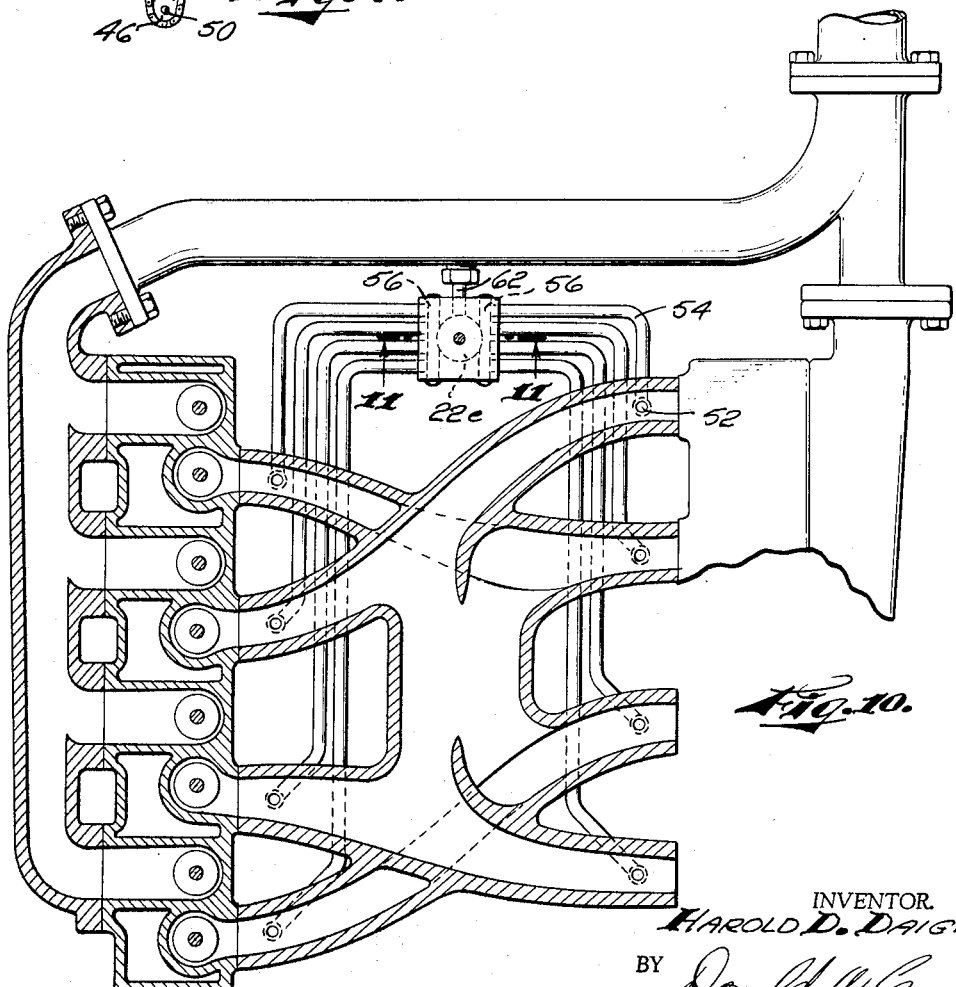
INVENTOR.
HAROLD D. DAIGH
BY
ATTORNEY

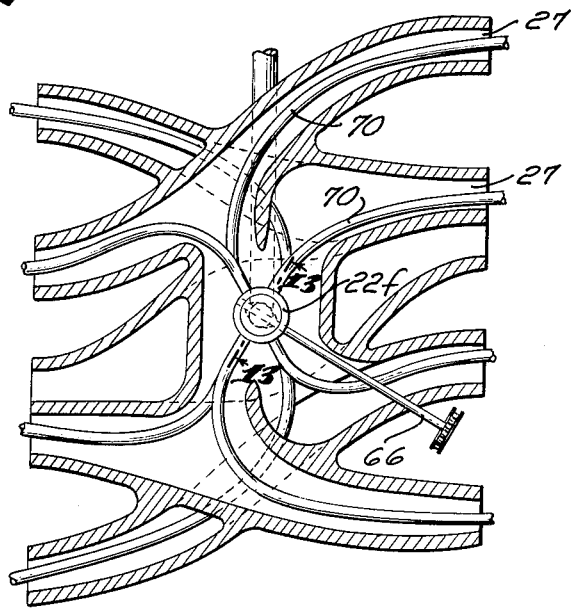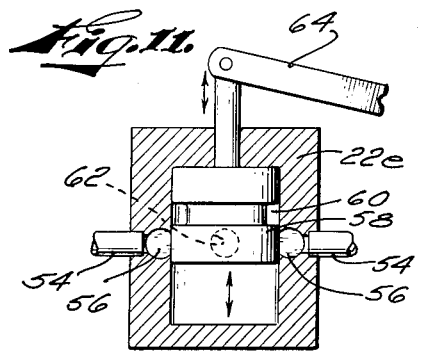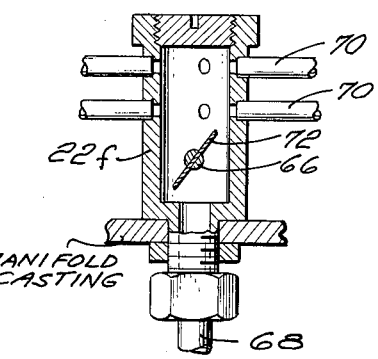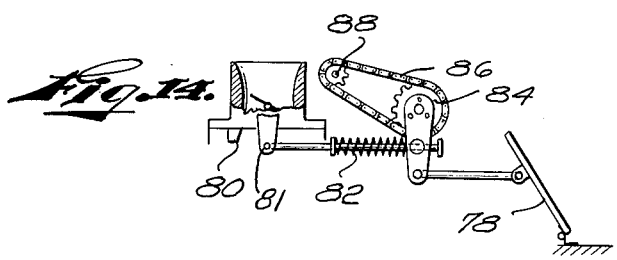

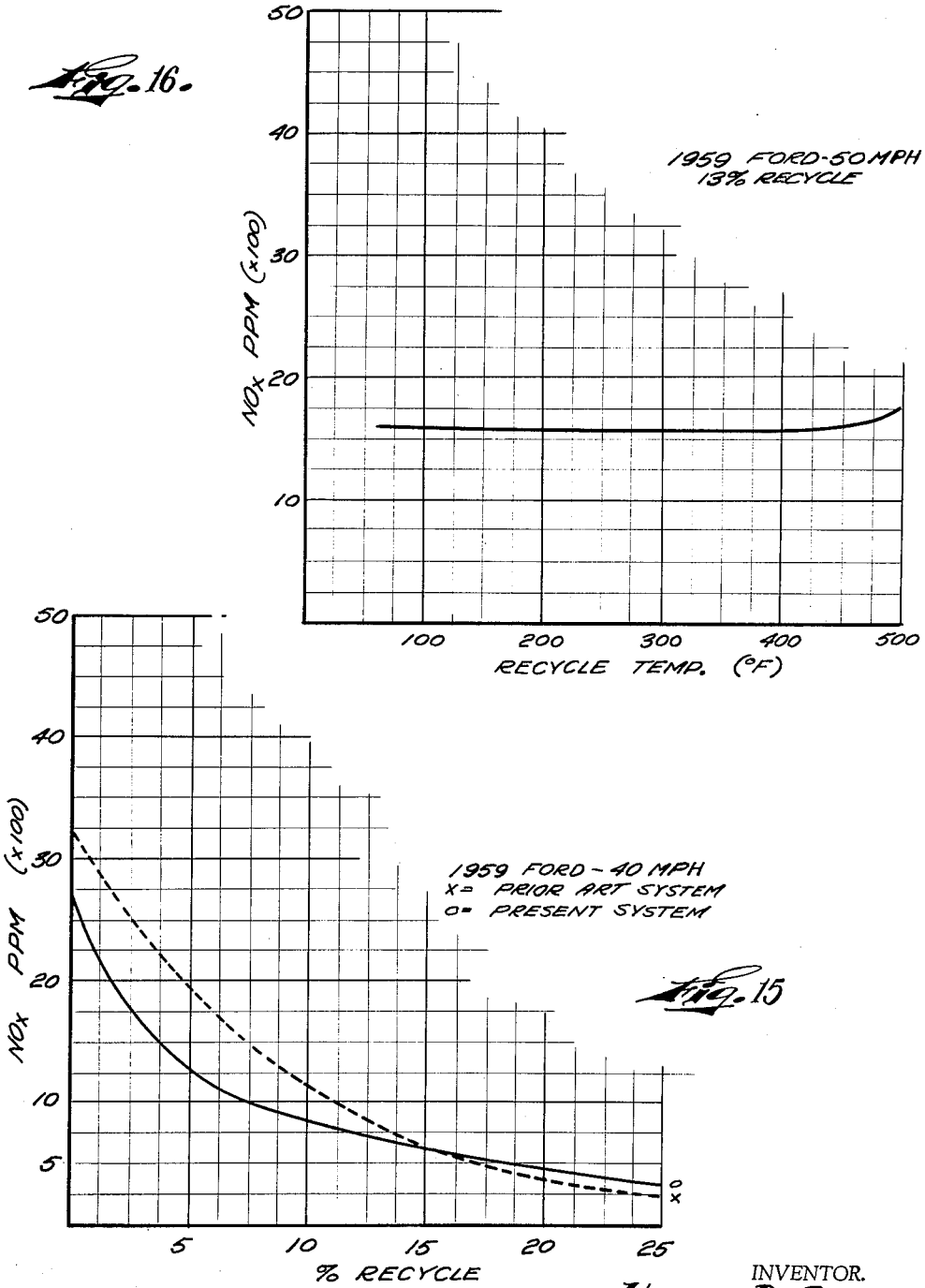

United States Patent Office 3,237,615
Patented Mar. 1, 1966

3,237,615
EXHAUST RECYCLE SYSTEM
Harold D. Daigh, Rolling Hills Estates, Calif., assignor to Richfield Oil Corporation, Los Angeles, Calif., a corporation of Delaware
Filed Nov. 13, 1962, Ser. No. 237,162
22 Claims. (Cl. 123—119)

This is a continuation-in-part application of my application Serial No. 145,167, filed October 16, 1961 and now abandoned.

This invention relates to an improvement in automotive engines and more particularly relates to an exhaust gas recycle system for automotive engines whereby a portion of the exhaust gas is recycled into the induction system.

In the prior art, numerous systems have been devised to recycle exhaust gas into the induction system whereby the exhaust gases are cooled prior to their injection into the induction system. Among the purposes for recycling the exhaust gases according to the prior art is to pre-heat and vaporize the incoming air-fuel mixture to facilitate complete combustion of the mixture in the combustion zone. Another purpose for recycling exhaust gases according to the prior art is to re-use the unignited or partially burned portions of the fuel which would otherwise pass out the exhaust pipe and into the atmosphere. More recently it has been proposed to recycle exhaust gases into the induction system for the purpose of reducing the oxides of nitrogen emitted from the exhaust system into the atmosphere and thereby reduce air pollution due to automotive engine exhaust.

One of the recent exhaust recycle system proposals contemplates returning exhaust gases from the tail pipe into the induction system whereby air cooling is effected by contacting the recycle tube with atmospheric air. Such systems, however, necessarily involve excessive "plumbing" or piping to convey the exhaust gases from the tail pipe to the induction system and it has been found that this prior art type of recycle system will entrap moisture which, during the warm-up period, may be drawn into the engine and cause rough engine operation and increased engine wear.

Other exhaust recycle systems propose to inject the recycled gases above the air-fuel mixer or carburetor. It has been found that such systems, in addition to gumming up the carburetor, do not provide for the induction of sufficient recycle into the intake manifold since there isn't sufficient pressure differential above the carburetor to draw the recycle gases into the intake manifold. It has been found that at least about 15% exhaust gas recycle is required at moderate speeds to substantially reduce the nitrogen oxide content of the exhaust gases discharged in the atmosphere, that is, to below about 1000 parts per million.

It is therefore a primary object of my present invention to provide an automotive engine exhaust gas recycle system for substantially reducing the nitrogen oxide content of exhaust gas.

It is a further object of my present invention to provide a method for recycling automotive engine exhaust whereby the nitrogen oxide content of the exhaust gas is effectively reduced.

It is also an object of my present invention to provide an automotive engine exhaust gas recycle system whereby recycle exhaust gas is pre-cooled by heat exchange with the air-fuel mixture and injected into the induction system down-stream from the carburetor.

It is also an object of my present invention to provide an internal combustion engine exhaust gas recycle system whereby smooth engine performance is maintained at all throttle settings.

It is a further object of my present invention to provide an internal combustion engine exhaust gas recycle system whereby full power is maintained during full throttle settings of the carburetor.

It is a further object of my present invention to provide an exhaust gas recycle system whereby piping requirements are reduced and the entrance of condensed exhaust gas vapors into the induction system is substantially eliminated.

It is a further object of my present invention to provide an exhaust gas recycle system whereby recycle exhaust gas is pre-cooled and drawn into the induction system below the air-fuel mixer by induction manifold vacuum.

It is a further object of my present invention to provide an internal combustion engine exhaust gas recycle system whereby recycle exhaust gas is removed from the engine in the heat riser area and cooled prior to injecting into the induction system by passing said exhaust gas into heat exchange relationship with the incoming air-fuel gas mixture.

Other objects and a more complete understanding of my present invention may be had by reference to the following specification and the appended claims taken in conjunction with the accompanying drawings in which:

FIG. 1 is a front elevation partly in section, of an internal combustion engine showing the path of exhaust gas through the heat riser;

FIG. 1a shows an enlarged sectional view of valve 22 with linkage to the accelerator pedal;

FIG. 3 is a front elevation in section of an intake manifold according to a modification of my present invention;

FIG. 6 is a front elevation, in section, of an internal combustion engine utilizing another modification of my present invention;

FIG. 7 is a plan view, in section, of an engine with another modified form of my present invention;

FIG. 8 shows in partial section a recycle control system utilized in my present invention;

FIG. 9 shows a side elevation of the valve control linkage shown in FIG. 8;

FIG. 10 is a plan view of a modification of an internal combustion engine utilizing my present invention;

FIG. 11 is an enlarged sectional view in elevation, of the exhaust recycle control valve utilized in the system of FIG. 10;

FIG. 12 is a sectional plan view of an intake manifold utilizing a modified form of my invention;

FIG. 13 shows a sectional elevation through section 13—13 of FIG. 12;

FIG. 14 is a schematic elevation of throttle linkage used on an automobile using my invention;

FIG. 15 is a graphical showing of the relationship of nitrogen oxide emissions with percentage exhaust recycle;

FIG. 16 shows graphically the relationship of nitrogen oxide emissions and recycle temperature.

Figure 2:
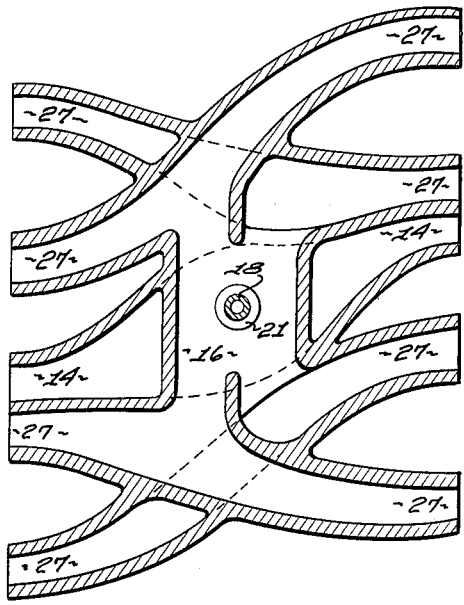
FIG. 2 is a plan view in section, taken on 2—2 of FIG. 1 showing the intake manifold.

Briefly described, my present invention in its preferred form provides a means for recycling exhaust gas from an internal combustion engine by removing a portion of the exhaust gas from the heat riser area or other exhaust passageway, and passing such gas through a conduit in the induction system where the recycle gas is pre-cooled by heat exchange with the incoming air-fuel mixture. The pre-cooled recycle exhaust gas is then injected into admixture with the air-fuel mixture downstream from the air-fuel mixer with an appropriate recycle control valve, which valve may be coupled to the air-fuel mixer throttle valve accelerator mechanism at any convenient point from the throttle valve shaft to the foot pedal or hand throttle and remain substantially closed at "idle," and open to permit passage of maximum recycle between idle and floorboard throttle so that at part-throttle positions which encompasses the throttle valve accelerator mechanism positions between idle and floorboard a fixed maximum amount of exhaust gas is recycled into the induction system. "Part-throttle" as used herein refers to the accelerator mechanism and includes its positions or settings between idle and floorboard. The expressions "detent" throttle, "full" throttle, and "wide open" throttle which are used interchangeably, refer generally to the carburetor throttle and are considered for purposes of this specification to be part-throttle positions with reference to the accelerator mechanism. "Cruising speed" throttle position is any of a variety of part-throttle positions and refers generally to any constant speed in the cruising range. The recycle valve of my present invention is so coupled to the throttle valve or accelerator mechanism that when floorboard position of the accelerator mechanism is reached the recycle valve is closed so that substantially no exhaust gas is recycled into the induction system which would prevent the development of full power. Due to high vacuum at idle, there may be slight leakage of exhaust gas past the recycle valve during idle, which percentage-wise may be substantial; however, since the actual quantity of such leakage would be very small, this leakage would be regarded as substantially no recycle of exhaust gas.

In recycle systems, cooling the exhaust recycle prior to injection into the air-fuel charge aids in maintaining a high charge density thus avoiding the use of excessive recycle volumes which would require drastic carburetor calibration alteration to attain a given percentage of exhaust recycle. Reduction in recycle volume also permits usage of smaller recycle equipment.

Referring now more particularly to the drawings, FIG. 1 shows a cross section through a conventional V-8 internal combustion engine having a combustion chamber 6, a carburetor 7, and an induction system 8. Exhaust gas is discharged into the exhaust manifold 12 and the heat riser channel 14 when exhaust valve 9 is opened during the exhaust cycle. A conventional heat riser 14 conveys a portion of the exhaust gas from one or more of the exhaust outlets through a passageway or channel 14 to pre-heat or vaporize the air-fuel mixture passing through the induction system into the intake manifold by heat exchange through a hot plate 16.

The hot plate section of the conventional heat riser, is conventionally used to heat and vaporize the air-fuel mixture coming from the carburetor prior to its passage into the combustion chamber through the intake manifold. It is within the scope of the present invention to utilize the hot recycled exhaust gas to heat and vaporize the air-fuel mixture within the intake manifold while cooling the recycled gas prior to its injection into the induction system. While the total heat content of the charge is not altered within the confines of the induction system, the fact that the exhaust recycle portion of the charge is cooled is believed to be beneficial as above mentioned and in reducing the nitrogen oxides content of the exhaust. As shown in FIG. 2, the heat riser 14 extends to the hot plate 16 from both cylinder banks of the engine illustrated.

A pipe 18 having cooling fins 21 passes through the hot plate 16, as best viewed in FIG. 1, to recycle a portion of the gas passing through the heat riser into the induction system 8 through a recycle manifold 17 and circumferentially spaced openings 20. Pipe 18 passes through the intake manifold 19 as shown, and is contacted by the cooler incoming air-fuel mixture to thereby effect a heat exchange therewith, thus resulting in the cooling of the recycled exhaust gas. The pipe 18 then passes into the upper end of the intake manifold 19 just below the carburetor 7 so that the exhaust gas recycled through the pipe 18 combines with the air-fuel mixture passing from the carburetor through the intake manifold 19 into the combustion chambers through intake ports 27 (FIG. 2). With the recycle entering the charge downstream from the carburetor, as shown by applicant, manifold vacuum may be utilized to draw recycle gases from the heat riser 14 through pipe 18.

A valve 22 is positioned within the pipe 18 and connected to the foot throttle (not shown) with suitable linkage to control the amount of exhaust gas that is recycled into the intake manifold. Valve 22 is so coupled to the foot throttle that at idle throttle position the valve 22 is substantially closed so that very little or substantially no exhaust gas is recycled into the engines through the intake manifold. As the carburetor throttle valve is opened to increase the speed of the engine, the valve 22 gradually opens to recycle a proportionately larger amount of exhaust gas into the engine until at wide-open throttle where the volume of exhaust gas is greatest, a controlled maximum amount of exhaust gas is recycled into the combustion chambers through the intake manifold 8. At floorboard position (of the foot pedal) where full power is desired for passing or rapid acceleration, the valve 22 closes so that substantially no exhaust gas is recycled into the engine. By preventing the recycle of exhaust gas into the engine at floorboard position, the air-fuel mixture is effectively enriched so that full power is obtained when needed. As will be discussed hereinbelow the amount of exhaust gas recycled into the engines has a pronounced effect on the reduction of nitrogen oxides in the exhaust gas.

For purposes of illustration, a barrel or sleeve-type valve is shown in FIG. 1a to accomplish the above-mentioned conjoint operation. The position of the valve is shown in phantom at a, b, and c for the idle, wide-open, and floorboard throttle positions, respectively. A butterfly-type valve 22b, as shown in FIG. 8, has also been found to work effectively for this purpose. The butterflies 40 are moved with shaft 42 which is linked to the foot pedal (not shown). A gear 44 is mounted on the shaft 42 which drives gear 46 through a suitable connection means such as chain 48. The driven gear 46 controls the operation of the valve 22a which in turn controls the amount of exhaust recycled into the induction system 19 through pipe 18. The valve 22a is coupled to gear 46 through shaft 50. The gear ratio between the gears 44 and 46 should be greater than 1:1 to provide for closing the valve 22a at floorboard throttle position. Although a butterfly valve 22a is shown in FIG. 8, it is within the skill of the art to substitute other types of valves which can be operated conjointly with the carburetor throttle valve to effect the desired result as set forth above.

In the apparatus shown in FIG. 8 with the exhaust recycle valve coupled directly to the carburetor throttle shaft 42, the recycle control valve 22b will gradually close as the throttle reaches wide open thus recycling exhaust at part-throttle positoin of the accelerator mechanism up to (but not including) wide open throttle. In high speed to (but not including) wide open throttle. In high powered engines such an arrangement is satisfactory from a nitrogen oxide reduction standpoint since such engines operate most of the time at lower part-throttle positions where maximum exhaust is recycled with this direct linkage. In engines operating normally at higher part-throttle positions where such direct linkage would result in normal operation where the recycle control valve is partially closed, it is preferable to utilize linkage as shown schematically in FIG. 14 whereby the recycle control valve is coupled to the foot pedal 78 in such a manner that the carburetor throttle can be wide open, and the recycle valve open. Although "wide open throttle" and "floorboard" positions are the same on a carburetor throttle valve, these positions may be distinct on the accelerator mechanism, such as foot pedal 78, which is the mechanism to which the recycle control valve is coupled in the apparatus shown in FIG. 14. Hence, full throttle setting on the throttle may be only a part-throttle position of the accelerator mechanism. Thus, in order to have the recycle open at wide open throttle (foot pedal position) but closed at "floorboard," as shown in FIG. 14, the carburetor throttle mechanism may contain a stop 80 which is engaged by the throttle shaft arm 81 at wide open throttle. Further depression of the foot pedal to the floorboard position depresses the spring 82 and drives the gear 84 which in turn, through chain drive mechanism 86, closes the recycle control valve through the recycle control valve shaft 88. This arrangement gives full power at floorboard throttle position by closing the recycle valve.

FIG. 3 shows a modification of my invention wherein the passageway 18a is formed within the intake manifold 19a and receives exhaust gas from the heat riser through the hot plate 16 and passes the exhaust gas into the air-fuel mixture into the intake manifold through a vacuum-operated valve 22a, thus cooling the recycle exhaust gas between the hot plate and the recycle manifold 17a. Valve 22a may also be of the barrel or butterfly-type as previously mentioned, in which case it would protrude through the intake manifold 19a and conveniently be coupled to the carburetor throttle valve (not shown) externally of the intake manifold to effect the coupling arrangement as above described for valve 22 of FIG. 1 or valve 22a of FIG. 8.

Figure 4:
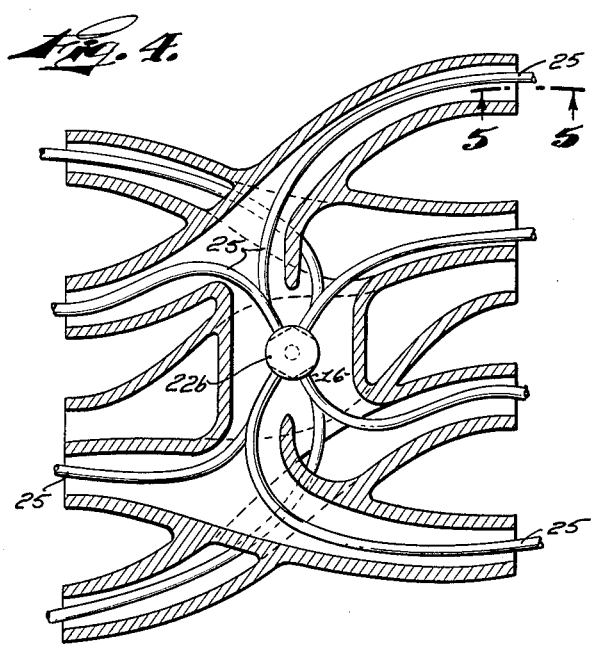
FIG. 4 shows a plan view in section, of a modified form of my present invention.
Figure 5:
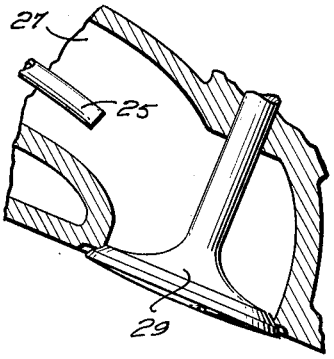
FIG. 5 shows in elevation and in partial section, an intake port and valve utilized in the form of my invention shown in FIG. 4.

FIGS. 4 and 5 show another modification of my present invention wherein a valve, such as an intake manifold vacuum controlled valve 22a as shown in FIG. 3, is positioned within the exhaust pipe 18 and has high thermal conductivity distribution tubes 25 through which recycle exhaust gas is fed directly into the intake manifold ports 27 and the combustion chambers through intake valves 29.

Where the exhaust recycle system of my present invention is to be utilized with engines which do not employ a heat riser for vaporizing the air-fuel mixtures, the recycle can be taken directly from the exhaust manifold, as shown in FIG. 6, or from any convenient portion of the exhaust system such as, for example, from the crossover pipe, as shown in FIG. 7. The recycle pipe 18 conveying exhaust from the exhaust manifold 12, may be run through the intake manifold from the underside, as in FIG. 7, or, as shown in FIG. 6, may be run into the side of the intake manifold and through the interior of the manifold where heat exchange with the incoming air-fuel mixture is effected, after which the recycle is passed through a regulating valve 22 and then into the air-fuel mixture in the intake manifold, as shown in either FIGS. 1, or 4 and 5, or modification thereof.

FIG. 7 shows another ramification of my exhaust recycle system where the exhaust is taken from a location other than the heat riser and, as shown, recycle is taken through pipe 18d from the exhaust crossover pipe 23 which leads from the exhaust manifold to the muffler (not shown), and piped into the intake manifold from the underside and in through the valved portion 22d of the pipe 18d. The valve 22d is preferably an intake manifold vacuum control valve, as shown at 22a in FIG. 3.

FIG. 10 shows an exhaust recycle system similar to the system shown in FIG. 7 with the recycle control valve 22e externally located. The exhaust recycle is fed directly into the intake manifold through ports 52 with tubular conduits 54. Valve 22e, as best viewed in FIG. 11, may be a sliding barrel valve with recycle entering the tubular conduits 54 through the manifold ports 56 when the cylinder 58 of the barrel valve is in a part throttle position between idle and floorboard. The valve is shown in idle position with the cylinder 58 preventing flow of exhaust recycle into the manifold ports 56. At cruising speeds the opening 60 is adjacent the manifold ports 56 so that exhaust gas may flow through inlet pipe 62, the manifold ports 56, into the intake manifold through tubular member 54 and manifold ports 52. At floorboard position the cylinder 58 is in its lowermost position, thus preventing recycle from entering into the manifold ports 56. The linkage 64 is connected to the foot throttle (not shown).

FIG. 12 shows another form of my present invention, similar to that shown in FIG. 4, with a butterfly type valve 22f connected for conjoint operation with the foot throttle (not shown) through the rotary shaft 66, which may be gear-chain driven as shown in FIG. 9 or FIG. 14. Recycle gas enters the valve 22f through a bottom inlet 68 as best shown in FIG. 13 and passes through the tubes 70 into the intake manifold ports 27. The butterfly valve 72 controls the flow of gas into the upper portion of the valve body 22f where the gas enters the tubes 70.

The exhaust recycle apparatus of the present invention was installed on a 1959 Ford automobile having a 292 cubic inch V-8 engine and operated at 0, 5, 10, 15 and 25% exhaust recycle at the constant speed of 40 miles per hour on a chassis dynamometer. Table I shows the comparative data accumulated on the above five runs using the recycle system of the present invention. An exhaust recycle system of the prior art of the type which draws exhaust from a point near the end of the tail pipe and recycles it into the intake manifold directly, thus effecting cooling by the long tubing passageway from the end of the exhaust pipe to the carburetor, was tested using the same 1959 Ford automobile at 5 different exhaust recycle rates. The results are tabulated in Table II.

TABLE I

*Exhaust recycle—1959 Ford*

| Test No. | 1 | 2 | 3 | 4 | 5 |
|---|---|---|---|---|---|
| Ventura Vacuum, In. $H_2O$ | 2.3 | 2.3 | 2.3 | 2.2 | 2.3 |
| Carburetor Air Flow, #/Hr | 190 | 192 | 192 | 188 | 192 |
| Recycle Vacuum, In. $H_2O$ | 0 | .25 | .75 | 1.70 | 4.5 |
| Recycle, #/Hr.[1] | 0 | 9.6 | 19.2 | 28.2 | 48.0 |
| Recycle, Percent[2] | 0 | 5 | 10 | 15 | 25 |
| Fuel Flow, Percent | 24.7 | 24.1 | 24.0 | 24.0 | 25.0 |
| Fuel Flow, #/Hr | 12.7 | 12.4 | 12.3 | 12.3 | 12.9 |
| A.F.R | 15.1 | 15.5 | 15.6 | 15.3 | 14.9 |
| Manifold Vacuum, In. Hg | 16.9 | 16.0 | 15.9 | 15.2 | 14.2 |
| Torque | 16.4 | 16.75 | 16.4 | 16.75 | 16.75 |
| M.p.h | 40 | 40 | 40 | 40 | 40 |
| Ignition Timing (B.T.C.) | 6° | 6° | 6° | 6° | 6° |
| R.p.m | 1,925 | 1,925 | 1,925 | 1,925 | 1,925 |
| Miles/Gal | 19.84 | 20.32 | 20.49 | 20.49 | 19.54 |
| Temperatures, °F.: | | | | | |
| Heat Riser | 230 | 618 | 670 | 772 | 880 |
| Tailpipe | 425 | 424 | 425 | 426 | 450 |
| Intake Manifold (Front) | 88 | 115 | 120 | 124 | 134 |
| Intake Manifold (Rear) | 104 | 100 | 103 | 115 | 126 |
| Recycle (Front) | NA | 199 | 237 | 298 | 374 |
| Recycle (Rear) | NA | 107 | 120 | 142 | 204 |
| Spark Plug | 1,080 | 1,000 | 975 | 940 | 900 |
| Ambient | 68 | 68 | 68 | 68 | 68 |
| Air Inlet | 80 | 81 | 80 | 80 | 80 |
| Humidity | 50 | 54 | 54 | 60 | 60 |
| Nitrogen Oxide in Exhaust, parts per million | 2,800 | 1,200 | 910 | 610 | 300 |

NOTE.—Engine ran smooth at all times.
[1] Corrected for temperature.
[2] Expressed as percentage of intake air. Corrected only for temperature.

TABLE II

*Exhaust recycle—1959 Ford prior art system*

| Test No | 1 | 2 | 3 | 4 | 5 |
|---|---|---|---|---|---|
| Ventura Vacuum, In. $H_2O$ | 2.2 | 2.1 | 2.1 | 2.1 | 2.3 |
| Carburetor Air Flow, #/Hr | 187 | 183 | 183 | 183 | 192 |
| Recycle Vacuum, In. $H_2O$ | 0 | 2.1 | 2.6 | 3.4 | 4.3 |
| Recycle #/Hr.[1] | 0 | 32.0 | 36.6 | 41.2 | 48.0 |
| Recycle, Percent [2] | 0 | 17½ | 20 | 22½ | 25 |
| Fuel Flow, Percent | 25.0 | 27.8 | 24.5 | 24.2 | 25.5 |
| Fuel Flow, #/Hr | 12.9 | 12.8 | 12.6 | 12.5 | 13.2 |
| A.F.R. | 14.5 | 14.3 | 14.5 | 14.6 | 14.6 |
| Manifold Vacuum, In. Hg | 15.7 | 14.3 | 14.2 | 13.7 | 13.2 |
| Torque | 15.6 | 15.6 | 15.6 | 15.6 | 15.6 |
| M.p.h | 40 | 40 | 40 | 40 | 40 |
| Ignition Timing (B.T.C.) | 6° | 6° | 6° | 6° | 6° |
| R.p.m | 1,925 | 1,925 | 1,925 | 1,925 | 1,925 |
| Miles/Gal | 19.53 | 19.69 | 20.00 | 20.16 | 19.09 |
| Temperatures, °F.: | | | | | |
|   Heat Riser | 645 | 546 | 534 | 532 | 538 |
|   Tailpipe | 430 | 445 | 435 | 460 | 495 |
|   Intake Manifold (Front) | 125 | 120 | 122 | 119 | 119 |
|   Intake Manifold (Rear) | 127 | 121 | 119 | 117 | 117 |
|   Recycle (Front) | NA | | | | |
|   Recycle (Rear) | 99 | 104 | 108 | 109 | 109 |
|   Spark Plug | 1,200 | 915 | 890 | 845 | 825 |
|   Ambient | 70 | 69 | 69 | 69 | 69 |
|   Air Inlet | 82 | 82 | 81 | 81 | 80 |
|   Humidity | 85 | 86 | 86 | 86 | 86 |
| Nitrogen Oxide in Exhaust, parts per million | 3,200 | 500 | 365 | 260 | 247 |

NOTE.—Engine smooth except at 25% recycle then became a little rough.
[1] Corrected for temperature.
[2] Expressed as percentage of intake air. Corrected only for temperature.

The effect of the percent exhaust recycled on the nitrogen oxide content of the exhaust gas is graphically shown in FIG. 8 for the two systems tested and with the device of the present invention the graph shows that in order to reduce the nitrogen oxide content to below 1000 parts per million, at least 7 percent of the exhaust must be recycled. In order to reduce the nitrogen oxide content to 500 parts per million, a recycle rate of approximately 17½ percent is required for both systems. Nitrogen oxide concentrations of 600–750 parts per million are believed to be acceptable to air pollution control authorities. Thus, at least approximately 15 percent exhaust recycle should be obtained to effect the desired nitrogen oxide reduction.

As noted in Table II, the engine performance using the prior art device became rough at 25 percent exhaust recycle. This engine roughness which was absent in the tests utilizing the device of the present invention, is believed to be attributable to the entrapment of moisture in the form of slugs of water which are drawn into the engine. This moisture causes increased engine wear as well as rough engine operation.

Thus it can be seen that a predetermined maximum recycle should be effected to reduce the nitrogen oxide concentration in the exhaust gas to an acceptable level. This maximum recycle amount varies at different speeds and varies from engine to engine. The expression "maximum recycle" as used herein refers to the maximum recycle rate for a particular engine at a certain speed which can be recycled without causing rough engine operation, and generally is about 15–25% of the exhaust gas, although this expression is not to be limited to such range. Hence, a valve linkage arrangement recycling maximum recycle at wide open throttle would normally effect a recycle rate of about 15–25% of the exhaust gas into the induction system.

The relative costs of installing the two systems favor the device of the present invention since much less recycle tubing is utilized.

In separate runs the recycle temperature was varied between 100 and 500° F. and a comparison of the nitrogen oxide content of the exhaust gases at the various temperature runs indicated that at below 500° F. the recycle temperature has no appreciable effect on the nitrogen oxide concentration. These results are shown graphically in FIG. 9. Consequently, the system of my present invention is effective if the exhaust gas is recycled at 500° F. or less.

The exhaust gas recycle temperature is not believed to be critical, however, as shown in the above test, it is believed that some cooling is necessary to cool the exhaust gas from the heat riser area from its normal temperature of 600 to 1000° F to below the 500° F. level. A comparison of the recycle gas temperature using the device of the present invention (Table I) and the recycle gas temperature of a prior art system (Table II) indicates that when the recycle gas is cooled to a temperature of below about 140 to 150° F., engine roughness is encountered probably due to the condensation of moisture which enters the engine in the form of slugs, as mentioned above. Cooling of the recycle exhaust gas is also believed to be desirable to prevent the transfer of excess heat to the carburetor, and power loss, since too much expansion in the mixture gas would reduce the amount of fuel passing into the combustion zone. It was also noted from a comparison of the above two charts that the engine equipped with the device of the present invention produced more power and yielded a 2 to 3 percent fuel economy advantage over the prior art exhaust recycle device.

Although the present invention has been described with a certain degree of particularity, it is to be understood that the scope of my invention is not to be limited by the details set forth, but should be afforded the full breadth of the appended claims.

I claim:

1. In an exhaust recycle system for an internal combustion engine having a plurality of combustion chambers and valved exhaust outlets leading from said combustion chambers, an air-fuel mixer device having a throttle valve, and an induction manifold connecting said mixer device to said combustion chambers, the improvement comprising, in combination:
    a plurality of conduits communicating with said valved exhaust outlets and passing into heat exchange relationship with the interior of said induction manifold, said conduits terminating in said induction manifold whereby to convey exhaust gas into said combustion chambers, and
    valve means for controlling the flow of exhaust gas into said conduits.

2. The apparatus of claim 1 wherein said valve means are operated by induction manifold vacuum.

3. In an exhaust recycle system for an internal combustion engine having a combustion chamber and a valved exhaust outlet leading therefrom with a portion of the exhaust gas passing through a heat riser, a carburetor having a throttle valve actuated by an accelerator mechainsm having idle position, part-throttle positions, and floorboard position thereon, and an induction manifold connecting said carburetor to said combustion chamber, the improvement comprising, in combination:
    means for recycling exhaust gas from said heat riser, said means passing through said intake manifold whereby said recycle exhaust gas is cooled by heat exchange with the incoming air-fuel mixture flowing from said carburetor to said combustion chamber through said induction manifold,
    means for injecting said cooled recycled exhaust gas into said air-fuel mixture in the induction system downstream from said carburetor, and
    means connected to said accelerator mechanism for controlling the flow of said recycled exhaust gas into said induction system whereby said control means are substantially closed at said idle and floorboard positions and open for maximum recycle of said exhaust gas into said induction system at said part-throttle positions.

4. In an exhaust recycle system for an internal combustion engine having a plurality of combustion chambers and valved exhaust outlets leading from said combustion chambers, an air-fuel mixer device having a throttle valve actuated by an accelerator mechanism having idle position, part-throttle positions and floorboard position thereon, and an induction manifold connecting said mixer device to said combustion chambers, the improvement comprising in combination:

a plurality of conduits communicating with said valved exhaust outlets, said conduits terminating in the induction manifold whereby to convey exhaust gas into said combustion chambers, means connected to said accelerator mechanism for controlling the flow of said recycled exhaust gas into said induction manifold through said conduits whereby said control means are substantially closed at said idle and floorboard positions and open for maximum recycle of said exhaust gas into said induction manifold at said part-throttle positions.

5. The apparatus of claim 4 wherein said conduits pass in heat exchange relationship with said induction manifold.

6. The apparatus of claim 4 wherein said control means include a valve body having an opening communicating with said exhaust outlets and a plurality of ports communicating with said conduits, and wherein a valve is interposed between said valve body opening and said valve body ports.

7. In an exhaust recycle system for an automotive engine having a combustion chamber and a valved exhaust outlet leading from said combustion chamber an air-fuel mixer device having a throttle valve operable on a rotary shaft actuated by an accelerator mechanism having idle position, part-throttle positions, and floorboard position thereon, an induction manifold connecting said device to said combustion chamber, the improvement comprising in combination:

a conduit providing communication between said valved exhaust outlet said induction manifold, and valve means for controlling the flow of exhaust gas through said conduit, and means connecting said throttle valve shaft to said valve means for conjoint operation whereby said control valve means are substantially closed at said idle and floorboard positions and open between said idle and said floorboard positions.

8. The apparatus of claim 7 wherein said control valve means are operated through a first gear, said first gear being connected to a second gear with a chain drive, said second gear being coupled to said throttle valve rotary shaft.

9. The apparatus of claim 8 wherein the ratio of the diameters of said second and first gears is greater than 1:1.

10. In an exhaust recycle system for an internal combustion engine having a combustion chamber and a valved exhaust outlet leading from said combustion chamber, an air-fuel mixer device having a throttle valve actuated by a foot pedal, and an induction manifold connecting said mixer device to said combustion chamber, the improvement comprising, in combination:

a conduit providing communication between said valved exhaust outlet and said induction manifold, valve means for controlling the flow of exhaust gas through said conduit, and means including a gear drive for connecting the throttle valve to said control valve means for conjoint operation, said gear drive being actuated by the foot pedal whereby floorboard position of said foot pedal closes said control valve.

11. The method of operating an automotive engine having a combustion chamber receiving an air-fuel mixture through an induction system from an air-fuel mixer device having a throttle valve thereon actuated by an accelerator mechanism having idle position, part-throttle positions, and floorboard position, and discharging exhaust gases through an exhaust system, comprising the following steps:

conveying a portion of the exhaust gases in heat exchange relationship with said air-fuel mixture in the induction system to cool that portion of said exhaust gases, introducing said cooled portion of said exhaust gases into the air-fuel mixture, and varying the flow of said recycled exhaust gases into said induction system whereby substantially no exhaust gas is recycled into said induction system at said idle and floorboard positions and maximum recycle of said exhaust gas into said induction system is effected at said part-throttle positions.

12. The method of operating an internal combustion engine having a combustion chamber receiving an air-fuel mixture through an induction system from an air-fuel mixer device having a throttle valve thereon actuated by an accelerator mechanism, and discharging exhaust gases through an exhaust system, comprising the following steps:

conveying about 17.5 percent of the exhaust gases in heat exchange relationship with the air-fuel mixture in the induction system to cool that portion of said exhaust gases, introducing said cooled portion of said exhaust gases into the air-fuel mixture, and varying the amount of said exhaust gases recycled into said induction system for different accelerator mechanism positions.

13. The method of operating an internal combustion engine having a combustion chamber receiving an air-fuel mixture through an induction system from an air-fuel mixer device having a throttle valve thereon actuated by an accelerator mechanism, and discharging exhaust gases through an exhaust system, comprising the following steps:

conveying between 15 and 25 percent of said exhaust gases in heat exchange relationship with the air-fuel mixture in the induction system to cool that portion of said exhaust gases, introducing said cooled portion of said exhaust gases into said air-fuel mixture, and varying the amount of said exhaust gases recycled into said induction system for different accelerator mechanism positions.

14. In an exhaust recycle system for an internal combustion engine having a combustion chamber and having an exhaust outlet leading from said combustion chamber, an air-fuel mixer device having a throttle valve actuated by an accelerator mechanism, an induction manifold connecting said device to said combustion chamber, the improvement comprising the combination:

conduit means providing communication between said exhaust outlet and said induction manifold and passing in heat exchange relationship with the induction manifold whereby gases from said exhaust outlet communicated through said conduit means into said induction manifold are cooled prior to injection into said induction manifold to a temperature in the range of 150 to 500° F., means for connecting said conduit means to the induction manifold downstream from said mixer device, control valve means in said conduit means for controlling the flow of exhaust into said induction manifold at a predetermined rate, and means for connecting said accelerator mechanism to said control valve means for conjoint operation.

15. In an exhaust recycle system for an internal combustion engine having a combustion chamber and having an exhaust outlet leading from said combustion chamber, an air-fuel mixer device having a throttle valve actuated by an accelerator mechanism having idle position, part-throttle positions, and floorboard position thereon, an induction manifold connecting said device to said combustion chamber, the improvement comprising the combination:
- a conduit providing communication between said exhaust outlet and said induction manifold and passing in heat exchange relationship with the induction manifold whereby the exhaust gases are cooled by said air-fuel mixture,
- means for connecting said conduit to the induction manifold downstream from said mixer device, and
- means connected to said throttle valve accelerator mechanism for controlling the flow of recycle exhaust gas into said induction system whereby said control means are substantially closed at said idle and floorboard positions and open for maximum recycle of said exhaust gas into said induction system at said part-throttle positions.

16. In an exhaust recycle system for an internal combustion engine having a plurality of combustion chambers and a valved exhaust outlet leading from said combustion chambers, an air-fuel mixer device having a throttle valve actuated by an accelerator mechanism having idle position, part-throttle positions, and floorboard position thereon, an induction system connecting said mixer device to said combustion chambers, the improvement comprising, in combination:
- a plurality of passageways communicating with said valved exhaust outlet and passing into heat exchange relationship with said induction system,
- said passageways terminating in said induction system to recycle exhaust gas into the air-fuel mixture therein, and
- means connected to said throttle valve accelerator mechanism for controlling the flow of said recycled exhaust gas into said induction system whereby said control means are substantially closed at said idle and floorboard positions and open for maximum recycle of said exhaust gas into said induction system at said part-throttle positions.

17. An exhaust recycle system for an internal combustion engine having a plurality of combustion chambers and valved exhaust outlets leading from said combustion chambers, an air-fuel mixer device with a throttle valve actuated by an accelerator mechanism having idle position, part-throttle positions, and floorboard position thereon, and an induction system providing communciation between said mixer device and said combustion chambers, the improvement comprising in combustion:
- a plurality of passageways arranged to receive exhaust gas from at least one of said valved exhaust outlets and convey sair exhaust gas into said combustion chambers whereby said exhaust gas is cooled prior to entering said combustion chamber.
- means connected to said throttle valve accelerator mechanism for controlling the flow of said recycled exhaust gas into said induction system whereby said control means are substantially closed at said idle and floorboard positions and open for maximum recycle of said exhaust gas into said induction system at said part-throttle positions.

18. In an exhaust recycle system for an internal combustion engine having a plurality of combustion chambers and valved exhaust outlets leading from said combustion chambers, an air-fuel mixer device with a throttle valve actuated by an accelerator mechanism having idle position, part-throttle positions, and floorboard position thereon, and an induction system providing fluid communication between said mixer device and said combustion chambers through induction system ports, the improvement comprising, in combination:
- means for passing exhaust gas from at least one of said exhaust outlets into an exhaust recycle member,
- a plurality of passageways passing from said exhaust recycle member into said induction system ports thereby to convey said exhaust gas into said combustion chambers,
- means connected to said throttle valve accelerator mechanism for controlling the flow of said recycled exhaust gas into said induction system whereby said control means are substantially closed at said idle and floorboard positions and open for maximum recycle of said exhaust gas into said induction system at said part-throttle positions.

19. In an exhaust recycle system for an internal combustion engine having a combustion chamber and valved exhaust outlet leading therefrom, an air-fuel mixer device having a throttle valve actuated by an accelerator mechanism having idle position, part-throttle positions, and floorboard position thereon, an induction system connecting said device to said combustion chamber and a conduit providing communication between said valved exhaust outlet and said induction system, the improvement comprising:
- means connected to said throttle valve accelerator mechanism for controlling the flow of said recycled exhaust gas into said induction system whereby said control means are substantially closed at said idle and floorboard positions and open for maximum recycle of said exhaust gas into said induction system at said part-throttle positions.

20. In an exhaust recycle system for an internal combustion engine having a plurality of combustion chambers and a plurality of valved exhaust outlets leading from said combustion chambers partially through a first exhaust manifold and partially through a second exhaust manifold and a crossover pipe to atmospheric discharge, an air-fuel mixer device having a throttle valve actuated by an accelerator mechanism, an induction system connecting said device to said combustion chambers, the improvement comprising, in combination:
- a conduit providing communication between said crossover pipe and said induction system downstream from said device,
- control valve means in said conduit for controlling the flow of exhaust gas into said induction system at a predetermined rate, and means connecting said accelerator mechanism to said control valve means for conjoint operation.

21. The apparatus of claim 20 wherein said control valve means includes a distribution valve having manifold ports therein for conveying exhaust recycle from said crossover pipe to said induction system.

22. In an exhaust recycle system for an internal combustion engine having a combustion chamber, an exhaust outlet leading from said combustion chamber actuated by an accelerator mechanism, an air-fuel mixer device having a throttle valve, an induction system connecting said device to said combustion chamber, the improvement comprising, in combination:
- conduit means providing communication between said exhaust outlet and said induction system and passing in heat exchange relationship with said induction system whereby gases from said exhaust outlet communicated through said conduit means into said induction system maintain the temperature of the mixture of the air-fuel charge and said recycled exhaust gas at about 150° F. as said mixture enters said combustion chamber,
- control valve means in said conduit means for controlling the flow of exhaust into said induction system, and means for connecting said accelerator mechanism to said control valve means for conjoint operation.

References Cited by the Examiner
UNITED STATES PATENTS

| | | | |
|---|---|---|---|
| 1,506,166 | 8/1924 | Durrant | 123—119 |
| 1,552,819 | 9/1925 | Brush | 123—119 |

(Other references on following page)

UNITED STATES PATENTS

| | | | |
|---|---|---|---|
| 1,697,385 | 1/1929 | Deppe | 123—119 |
| 1,909,032 | 5/1933 | Woolson | 123—119 |
| 2,114,548 | 4/1938 | Stadlman | 123—119 |
| 2,154,417 | 4/1939 | Anderson | 123—119 |
| 2,312,151 | 2/1943 | Crabtree et al. | 123—119 |
| 2,354,179 | 7/1944 | Blanc | 123—119 |
| 2,375,883 | 5/1945 | Anderson | 123—119 |
| 2,419,747 | 4/1947 | Wassman | 123—119 |
| 2,720,196 | 10/1955 | Wolf | 123—119 |

KARL J. ALBRECHT, *Primary Examiner.*